March 25, 1941.  W. E. HOGAN  2,235,996
BLANK CUTTING MACHINE
Filed Jan. 18, 1940
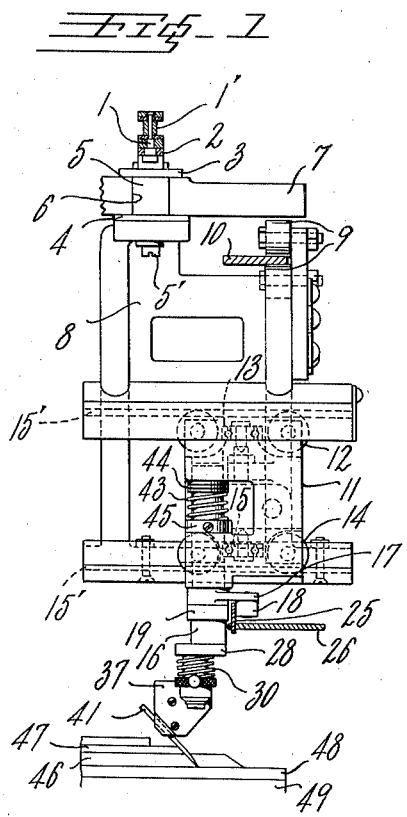
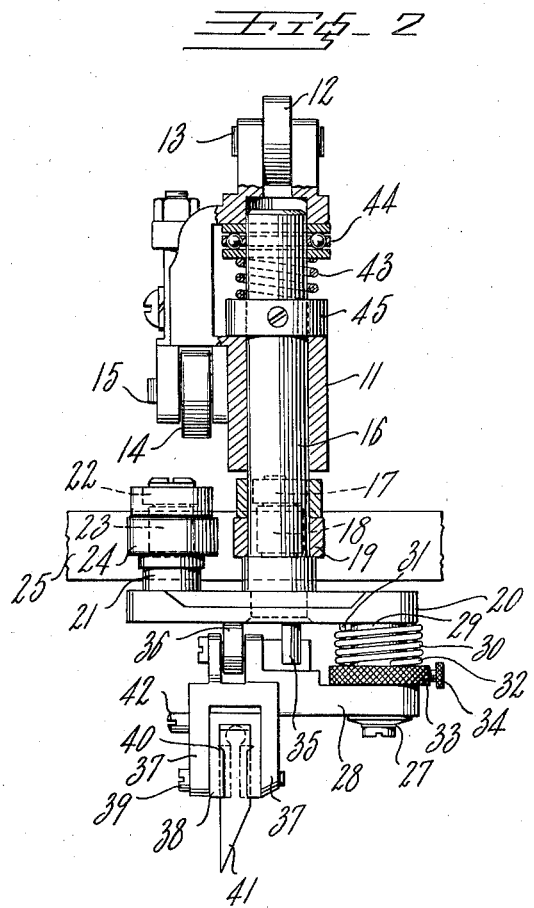
INVENTOR.
WILLIAM E. HOGAN
BY Gourley & Bradley
ATTORNEYS Patented Mar. 25, 1941

2,235,996

UNITED STATES PATENT OFFICE 2,235,996

BLANK CUTTING MACHINE

William E. Hogan, Medford, Mass., assignor to Wellman Company, Medford, Mass., a corporation of Maine Application January 18, 1940, Serial No. 314,379

5 Claims. (Cl. 12—25)

This invention relates to a blank cutting machine, and more particularly to an improved knife support for machines such as sole cutting machines.

While the invention is capable of more general use, it is more particularly applicable to sole cutting machines of the type disclosed in United States Patent No. 1,645,441.

In prior practice, a length of cooled and shrunk rubber stock is laid on a backing sheet of relatively soft material such as rag stock, which is a composition of ground up scrap rubber and fabric. During the cutting operation the sheet of rubber stock and its backing sheet of rag stock are clamped between a sole cutting form and the work bed of the machine, while the knife of the cutting mechanism is driven around the periphery of the form to cut out the sole. The backing sheet of rag stock is used to prevent injury to the point of the knife, since the latter is so supported that it is relatively immovable in a vertical direction. The backing sheets of rag stock quickly become scored by the point of the knife and must be replaced, which in an industry so highly competitive as rubber footwear is objectionable on account of the extra cost. Another objection is that as soon as the backing sheet of rag stock becomes somewhat scored, the scoring causes the lower edge of the sole to be cut irregularly, because the plastic rubber stock is not evenly supported at all points where it rests against the scored rag stock. Other soft materials than rag stock may be used, such as an endless rubber belt, upon which the material from which the blanks are to be cut may be carried to the knife and cut out thereon, but the belt is cut by the knife and has the same disadvantages as the rag stock.

Also, in present day manufacture, sole cutting machines of the type in question are subjected to extremely severe usage by reason of the heavy duty cutting which they are called upon to perform, in some cases the stock to be cut being a compound of rubber and cork which may be as much as one inch thick. The knife is drawn around the form at very high speed, and when cutting such a thick and tough stock as just described it is essential that the sheet of stock being cut be very firmly clamped between the form and work bed.

The present invention comprises a vertically resilient mounting for the knife carrying mechanism, which does not in any way affect the other movements of the knife in cutting but which by permitting a limited vertical knife movement enables the rag stock backing sheet to be eliminated and the stock sheet to be cut while firmly clamped between unyielding surfaces.

An object of my invention is to improve cutting machines for cutting blanks from plastic stock such as rubber.

Another object is to provide an improved cutting knife mounting which will avoid injury to the knife point under usual cutting conditions.

A further object is to obviate the use of a soft backing sheet for the stock during the cutting operation.

Other objects will appear from the detailed description and drawing, in which latter:

Figure 1 is a side elevation of an embodiment of the invention, together with the main portion of the drive mechanism for the knife, and Figure 2 is a side elevation, partly in section, on an enlarged scale, of the knife carriage and associated parts.

In the machine disclosed in the Patent No. 1,645,441 above referred to, the primary drive of the knife cutting mechanism consists of an endless chain moving in a closed elongated path. Attached to this chain at one point is a truck which is constrained to move in a similar elongated closed path, and this truck is attached to and drives the knife by a series of intermediate movable parts. At one intermediate point these parts are constrained to follow an elongated closed path which more closely approximates the shape of the sole to be cut, and at the end of the driving connections the knife is resiliently held against and moves around the outer edge of a sole form resting against the stock to be cut.

Referring to the drawing, the link pin 1 of the endless chain 1' in the machine of said prior patent is pivotally connected to one end of a drag bar 2. The opposite end of the bar 2 is pivotally attached to a bearing plate 3 which is attached to a second bearing plate 4 by the spindles 5' of a pair of anti-friction rolls 5 which are moved by the chain 1' in an elongated closed slot 6 in a bed 7, all as described in more detail in the said prior patent.

Attached to the lower plate 4 is a truck 8 which at its outer side carries superposed anti-friction rolls 9 bearing on an interposed guide plate 10 disposed below the bed 7. The purpose of the anti-friction rolls 9 is to take up thrust caused by the cutting action. Transversely movable horizontally in the truck 8, is a knife carriage 11, which at its upper end is provided with a pair of anti-friction rolls 12 having horizontally disposed axes, and a roll 13 having a vertically disposed axis. At its lower end the carriage 11 is similarly provided with a pair of anti-friction rolls 14 and a roll 15 having their axes arranged horizontally and vertically, respectively. These rolls are guided along suitable tracks 15' in the truck 8, as more specifically described in said prior patent.

Rotatably mounted in the carriage 11 is a spindle 16, and rotatable on the spindle is an arm 17 carrying an anti-friction roll 18. A second anti-friction roll 19 is rotatably mounted directly on the spindle 16, and is adapted to cooperate with the roll 18 for guiding the carriage 11. Attached to the lower end of the spindle 16 is a plate 20, at one end of which rises a vertically disposed spindle 21 on which is rotatably mounted an arm 22 similar to the arm 17 in Fig. 1. The arm 22 carries an anti-friction roll 23 shown in Fig. 2 and which is similar to the roll 18 on the arm 17. A second roll 24 is directly mounted on the spindle 21 and cooperates with the roll 23 in the same manner that roll 19 cooperates with roll 18 as shown in Fig. 1. The respective pairs of rolls 18, 19 and 23, 24 engage opposite sides of a vertical guiding flange 25 on a leader 26. This flange is endless and of a form more closely corresponding to a shoe sole to be cut out of the sheet material than the elongated slot 6. It will be seen that by the movable mounting of the carriage 11, it will move transversely in the truck as it is guided by the contour of the flange 25.

Extending downwardly from the plate 20 is a pin 27, and an arm 28 has a sleeve 29 rigidly attached thereto, which sleeve is rotatable on the pin 27. Surrounding the sleeve 29 is a coiled spring 30, the upper end of which is fixedly secured at 31 to the plate 20, while its lower end 32 is attached to a collar 33 surrounding the sleeve 29, which collar is adjustably secured to the sleeve by the set screw 34. By rotating the collar 33, the torsion exerted by the spring 30 can be increased or reduced. The spring 30 tends to swing the arm 28 in one direction, and its movement is limited by the stop pin 35 extending downwardly from the plate 20. Mounted at the opposite end of the arm 28 is an anti-friction roll 36, which is located directly above the knife, and in position to take up the thrust exerted during cutting. The arm 28 is provided with downwardly extending spaced fingers 37 between which is disposed a knife block 38, the latter being pivotally held in position by the screw 39 passing through the block and threaded in arm 37. The knife block is partly split and is provided with a dovetail groove 40 in which is adjustably held the knife 41. By tightening up the screw 39 the arms 37 are forced toward each other to not only hold the block 38 in position but to also force its two split portions together to firmly grip the knife. As an additional means for holding the knife block 38 in adjusted position, a set screw 42 is supplied.

As shown in Fig. 2, the upper end of the carriage 11 is cut away around the spindle 16, and disposed around the spindle at this point is a coiled compression spring 43, the upper end of which bears against a thrust bearing 44 while the lower end bears against a collar 45 secured on the spindle. It will be seen that by this construction the spindle 16 and associated parts including the knife may have a limited up and down movement, but are resiliently held in lowermost position by engagement of collar 45 with the carriage 11.

In operation, the stock 46 is clamped between the pattern 47 and the hard plate 48 which is in turn supported by the work bed 49. This plate 48 may be glass, hard metal or other suitable material and rigidly secured to or forming part of the work bed if desired. Instead the plate 48 may take the form of a sheet of hard metal, or equivalent, of lineal dimensions similar to the rag stock sheet previously employed, or of a flexible steel, or metallic endless belt which is movable over the work bed 49. In such latter case the operator merely lays the desired length of sole stock to be cut on the metal sheet or belt and then feeds the assembly through the machine with a step-by-step motion to cut out the soles from the rubber stock. By reason of the resilient mounting of the entire knife supporting mechanism on the spindle 16 the point of the knife can make a clean cut through the sheet of sole stock without bearing with undue pressure on the plate 48 or movable metal supporting sheet. Therefore, the machine with the present improvement can be used to cut any desired stock, including the heaviest and toughest, without the use of the formerly employed rag stock backing sheet or rubber belt, and yet this operation can be performed without injury to the point of the knife. The additional expense involved in the use of rag stock or rubber belt, and the poor cutting caused by the scoring of the rag stock or rubber belt are thus entirely obviated. Also, in case it is desired to feed the stock into the machine without any backing sheet, the part 48 may be rigidly attached to the work bed and may be formed of either glass, metal, or any other suitable hard material, as before stated.

Having thus described my invention, what I claim and desire to protect by Letters Patent is:

1. In a blank cutting machine, stock gripping means including a cutting form and a cooperating member, a knife and means for driving it around and in contact with said form, said driving means including a resilient support for constantly automatically urging the knife toward said cooperating member to a limited degree.

2. In a blank cutting machine, stock gripping means including a cutting form and a cooperating member, a knife and means for driving it around said form, said driving means including a rotatably mounted knife supporting spindle, and spring means acting on said spindle to urge it and the knife toward said cooperating member.

3. In a blank cutting machine, stock gripping means including a cutting form and a cooperating member, a knife and means for supporting and driving it around said form, said last means including a rotatably mounted knife supporting spindle, said spindle having a limited axial movement, and a spring acting to axially move said spindle and knife toward said cooperating member.

4. In a blank cutting machine, stock gripping means including a cutting form and a relatively impenetrable stock supporting member, a knife and means for supporting and driving it around said form, said last means including a rotatable vertically disposed spindle supporting the knife adjacent its lower end, a spring urging said spindle downwardly, and means for limiting said downward movement.

5. In a blank cutting machine, stock gripping means including a cutting form and a relatively impenetrable stock supporting member, a knife and means for supporting and driving it around said form, said last means including a rotatable and axially movable vertically disposed spindle supporting the knife adjacent its lower end, a coil compression spring surrounding said spindle and urging it and the supported knife downwardly toward said stock supporting member, the upper end of said spring bearing against a thrust bearing and the lower end against a collar fixed on said spindle.

WILLIAM E. HOGAN.